Sept. 9, 1947.  R. SUCZEK  2,427,237
UNIVERSAL JOINT
Filed May 26, 1943
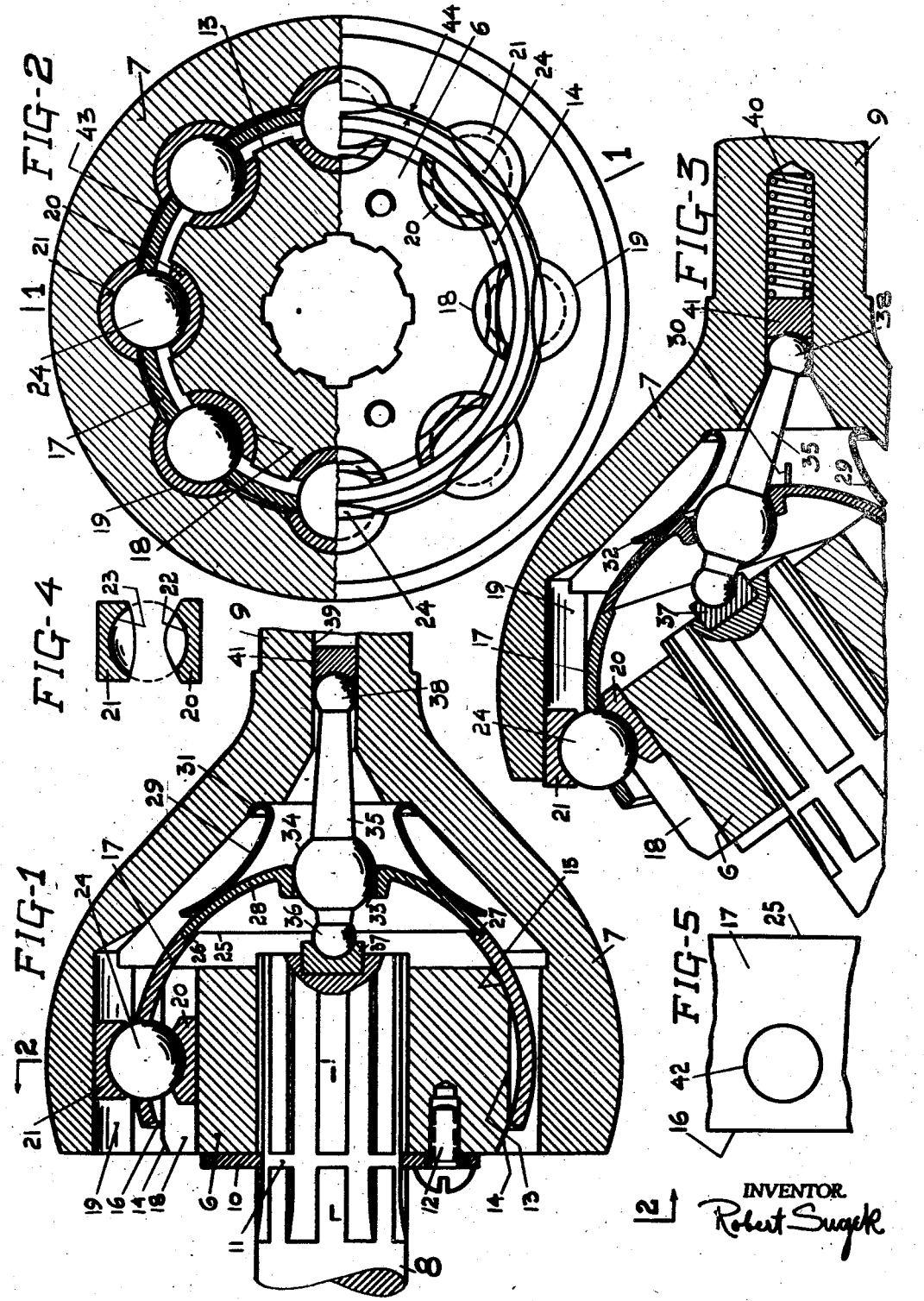
INVENTOR.
Robert Suczek Patented Sept. 9, 1947

2,427,237

UNITED STATES PATENT OFFICE 2,427,237

UNIVERSAL JOINT

Robert Suczek, Grosse Pointe, Mich.

Application May 26, 1943, Serial No. 488,538

4 Claims. (Cl. 64—21)

This invention relates to torque transmitting universal joints of the type known as constant velocity joints, in which the speed ratio between the driving and the driven members remains constant in all portions of the cycle of each rotation of the shafts, no matter what the relative angular position of the members and their axes about which they rotate may be.

My invention relates to such joints in which the torque is transmitted from one member to the other by balls, which move in meridian grooves, such grooves being preferably straight and cylindrical, it being understood however that I do not wish to restrict my invention to cylindrical grooves only and that any kind of grooves may be used without changing the scope of my invention.

Contrary to the conventionally known joints of this category, I do not let the balls roll and slide in direct contact with the grooves. I provide, according to my invention, two sockets for each ball and let the sockets slide in the grooves, while the balls are allowed to turn in ball shaped cavities of their respective sockets.

It has been shown by experience that the specific or unit pressure on the balls, of joints in which the balls are in direct contact with their grooves, is so great that the surface of the balls and of the grooves is soon damaged, and that the ball instead of rolling will only glide. This condition of course increases the friction between the balls and the grooves, the efficiency of the joint soon drops and the joint becomes noisy.

Thus the purpose of my invention is to preserve the life of the joint by preserving the contacting and torque transmitting surfaces of the balls and of the grooves, through reduction of the specific or unit pressures.

This unit pressure reduction I accomplish by placing the balls in sockets and letting the sockets slide either in cylindrical or angular grooves, providing ample contact surface between the groove surface and the sockets, while the ball is fitted on a spherical surface to its two sockets.

Whereas, in the conventional ball joints the balls contact the grooves, before the load is applied, in lines only, and the necessary contacting area on the surface is generated by deformation of the ball and the groove surfaces; while the required areas according to my invention are predetermined and do not have to be generated by deformation of the balls. Thus according to my invention these areas are spherical between the balls and their sockets and cylindrical or flat between the sockets and the grooves.

My invention also consists in a new shape of the ball cage. The ball cage has the purpose to control the motion of the balls and their sockets in their respective grooves, and it is located between the inner and the outer members of the joint.

According to my invention I let the ball cage glide on a spherical surface of the inner member, but in order to be able to assemble the inner member, ball cage and balls, I provide the segmental spherical cage with two circular openings, of which only one, the larger one permits the inner member to be slipped into the cage.

My invention further consists in the construction of a bell shaped spring for tending to press the cage or ball retainer against the inner member, and in the design of the seat of the spring in the other or the outer member where the spring has its reaction.

My invention also consists in using a special spherical cap between the spring and the cage and in seating this cap on the cage in a groove which preferably may be V-shaped.

With these and other advantages and objects of my invention in view, together with means whereby the same may be carried out my invention consists in the arrangement, construction and combination of various parts of my new device and method of operation as described in the following specification, claimed in the claims and illustrated in the accompanying drawings in which:

Fig. 1 is a longitudinal section along lines 1—1 of Fig. 2 through an assembly of a joint according to my invention, in which the axes of rotation of inner and outer joint members are in co-axial alignment (no angularity).

Fig. 2 is a cross section along lines 2—2 of Fig. 1, partly in view.

Fig. 3 is a longitudinal section of the joint in Fig. 1 with the axes of rotation of the two members inclined to each other.

Fig. 4 is a section through the two sockets in which a ball may be seated.

Fig. 5 is a part view of the ball cage (retainer) showing one of the cylindrical holes, which are radially arranged and which have the purpose of receiving the balls for regimentation.

In Figures 1, 2 and 3, numeral 6 represents the inner member and 7 the outer member of the joint. Inner member 6 is mounted in driving relation by splines on shaft 8 and outer member 7 forms an integral part with the other shaft 9. Either of the two shafts 8 and 9 may be the driving or the driven shaft, depending on the purpose for which the joint is used and upon its location.

The inner member 6 is axially fixed in relation to shaft 8 by a split ring 10, mounted in groove 11 and secured to the member 6 by suitable screws 12.

Member 6 has on its outside a cylindrical surface 13 and two spherical surfaces 14 and 15. Member 6 is surrounded by the ball cage or retainer 17, and to facilitate assembly, the cage has on its left hand side a circular opening 16 which is larger than the diameter of the cylindrical surface 13 of the member 6.

As will be seen from Fig. 2, members 6 and 7 are provided with a plurality of corresponding cylindrical grooves 18 and 19. Slidably fitted within these grooves are sockets 20 and 21. The groove pairs 18 and 19 are cylindrical as mentioned before and they have a common center line and are parallel to the axes of rotation of the members 6 and 7, so that they can be drilled in both members 6 and 7 simultaneously in one operation, and they also can be finished in one operation common to both members 6 and 7.

However my invention is not limited to the cylindrical shape of these grooves 18 and 19; they could be square or rectangular, or polygonal or even elliptical or the like. It is however obvious that the cylindrical shape of these holes has the great advantage that the holes can be drilled and easily machined to the highest degree of accuracy to fit the sockets 20 and 21.

The socket pairs 20 and 21 are provided with spherical surfaces 22 and 23 fitting the outer diameter of the torque transmitting balls 24. Mounting sockets 21 and 20 on ball 24, the outer contour of the two sockets must fit into the grooves 18 and 19 of the assembled members 6 and 7 without play or back-lash, so that the ball will snugly fit between the sockets, and the sockets in turn between the inner and the outer members.

This arrangement of ball, sockets and grooves of the joint makes it possible to transmit the torque by large areas without deformation of the ball surfaces. Thus the socket will contact on one side the joint members 6 and 7 on cylindrical surfaces which may be made sufficiently large, by increasing the length of the sockets, and on the other side it will be in contact with a ball surface and not only with a line of the surface as is the case when the balls are in direct contact with the members 6 and 7, as in the conventional joint.

It is obvious that the torque transmitting specific pressures between ball and sockets and between sockets and the members are lower than is the case if the sockets were left out.

The side of the cage 17 with the smaller opening 25 is facing the member 7 and carries an annular V-groove 26. Fitting into this groove is a ridge 27 of the cap 28, which cap is acted upon by the bell spring 29, tending to keep cap 28 and cage 17 in permanent contact in groove 26.

Spring 29 is provided with an annulus 31 fitting into a ring-groove of the member 7, and on its wider bell end spring 29 is subdivided into lips 32 by slots or cuts 30, in order to give the bell shaped larger end of the spring resiliency and sufficient deflection which it must have in order to act upon cap 38 within a certain desirable range of its positions.

Cap 28 has a cylindrical opening 33 fitting over the central ball 34 of the pilot 35. One end of the pilot is journaled in a bearing 37 of the shaft 8 and the other end 38 is sliding in bore 39 of shaft 9. Through the medium of a sliding block 41, spring 40 acts on the pilot pin 35, tending to keep the pilot end 36 in permanent engagement with bearing 37.

The operation of the joint members is the same as in any other joint with balls, cage, pilot, inner and outer member.

The movement of the sockets 20 and 21 in their grooves is illustrated in Fig. 3, and this figure also shows the movement of the sockets relative to the ball 24. The pilot 35 controls the movement of the cap 28 and of the cage 17, and the balls being located in the closely fitting holes 42 must follow strictly the angular motions of the cage, while they together with their sockets move up and down in grooves 18 and 19.

By transmitting the angular oscillating motions from the pilot to the cage and to the balls the sockets are forced to move and slide in the grooves due to the fact that the balls are deeply inbedded in the sockets.

While performing the angular oscillating motions, the cap 28 glides on spring 29, and spherical surface 15 of the inner member glides on the inner spherical surface of the cage 17.

Whether the outer spherical surface of the cage 17 glides on the inner cylindrical surface 43 of the outer member 7, depends on the radial clearance 44 between cage and outer member. It should be understood that the cage does not need to be closely fitted within the outer member 7 to assure a good function of the joint, and the clearance 44 between outer member and cage may be anything from a few thousandths of an inch to ⅛ of an inch or more.

It should also be noted that the sockets 20 and surface 43 of the outer member does not need to be cylindrical, instead it can be spherical and as such may closely be surrounding the spherical outer surface of the cage 17.

It should also be noted that the sockets 20 and 21 are so proportioned that they do not at any time during the operation of the joint get into contact with the cage 17. This is being accomplished by chamfering the corners of the sockets suitably as illustrated in Fig. 3 (socket 20) and by the close fit of the holes 42 of the retainer 17 to the balls 24 and by locating these holes strictly radial in relation to the cage.

What I claim is:

1. A universal joint comprising an outer member and an inner member locked together by balls for rotation, the inner member having a spherical surface and the outer member a cylindrical surface, with the inner member removably receivable within the cylindrical surface, a cage for regimentation of the balls able to act on the balls from axially opposed sides and a bell shaped lipped spring reacting in the outer member for holding the cage in engagement with the inner member on its spherical surface.

2. In a universal joint comprising two members, torque transmitting balls and a cage for the regimentation of the balls in their respective grooves provided in the members, and a resilient bell shaped member provided with lips, and means engaging the inside of the bell shaped member and transmitting its resilient pressure to the cage tending to hold the cage in contact with one of the two members, each torque transmitting ball being embedded in two sockets sliding with the balls in the grooves of the respective members.

3. A universal joint having two torque transmitting rotatable members with grooves for receiving torque transmitting balls and sockets, a spherical ball retainer provided with cylindrical holes closely fitting the balls, the grooves in the members being parallel to the respective axes of rotation of the members and the axes of the cylindrical holes of the retainer being located radially with respect to the ball retainer's spherical surface and the sockets for receiving the balls being formed on one side to closely receive the balls and on the opposite side being cylindrical.

4. In a universal joint, two members having corresponding races for receiving torque transmitting balls, a cage surrounding one of the members for the regimentation of the balls in their respective races when the members rotate, and means acting on the cage and imparting thereto angular oscillating motions in harmony with the relative motions of the two members, the cage being located on both sides of the balls and a bell shaped spring tending to keep the cage in permanent sliding surface contact with the surrounded member.

ROBERT SUCZEK.

REFERENCES CITED

The following references are of record in the file of this patent:

UNITED STATES PATENTS

| Number | Name | Date |
|---|---|---|
| 2,010,899 | Rzeppa | Aug. 13, 1935 |
| 1,310,021 | Johnson | July 15, 1919 |
| 2,352,776 | Dodge | July 4, 1944 |

FOREIGN PATENTS

| Number | Country | Date |
|---|---|---|
| 722,653 | France | 1932 |
| 384,274 | Great Britain | 1931 |
| 149,504 | Great Britain | 1920 |